Patented Apr. 5, 1932

1,852,497

UNITED STATES PATENT OFFICE

JOHN C. WOODHOUSE, OF WILMINGTON, DELAWARE, ASSIGNOR, BY MESNE ASSIGNMENTS, TO E. I. DU PONT DE NEMOURS & COMPANY, OF WILMINGTON, DELAWARE, A CORPORATION OF DELAWARE

GAS PURIFICATION

No Drawing. Application filed November 5, 1930. Serial No. 493,689.

This invention relates to the removal of carbon dioxide at elevated temperatures from gaseous mixtures containing the same and more particularly from mixtures containing carbon dioxide and hydrogen.

Numerous methods have been proposed for the removal of carbon dioxide from gaseous mixtures such as contacting the mixture with aqueous solutions of the caustic alkalies, scrubbing the carbon dioxide-containing gases with water at high pressures, or scrubbing the mixtures with solutions of ammonia. In these and similar processes, however, the separation has necessarily been accomplished at relatively low temperatures.

It is sometimes desirable, however, in removing carbon dioxide from gaseous mixtures, to effect the separation at an elevated temperature. Thus, for example, in the production of hydrogen by catalytic reaction of a gaseous mixture of steam and a carbon-containing compound such as carbon monoxide or a hydrocarbon, e. g. methane, it is known that a more efficient conversion of the carbon-containing material can be obtained if the gaseous products of the catalysis, including carbon dioxide, are subjected in a heated condition to carbon dioxide removal and then to further catalysis. That is, by removing the carbon dioxide from the reaction system and thereby displacing the established equilibrium a further conversion of the raw materials to hydrogen is made possible.

It is the object of this invention to provide an improved process for the removal of carbon dioxide at elevated temperatures from gaseous mixtures containing the same.

Other objects and advantages of the invention will be apparent as it is better understood by reference to the following specification wherein are described its details and preferred embodiments.

My invention may be generally stated as comprising a process for the removal of carbon dioxide from gaseous mixtures at elevated temperatures, say in excess of 100° C., by utilizing ferrous oxide as an absorbent thereof. And, further, that especially satisfactory absorption can be obtained with this material using increased pressure, say pressures of from 5 to 10 atmospheres and above.

Furthermore, my invention may be utilized for the preparation of hydrogen containing little or no methane or oxides of carbon by subjecting a gaseous mixture of steam and methane, at relatively low temperatures to the combined action of a divalent iron oxide and a catalyst. As a catalyst I employ an element, mixture or chemical compound that is catalytically active for the conversion of steam and methane to hydrogen, and especially the promoted catalysts described in the Roger Williams application Ser. No. 118,600, are particularly suitable. Thus, for example, the process may consist in submitting steam and methane to the combined action of ferrous oxide in the presence of nickel; cobalt; nickel and cobalt; nickel chromate; cobalt chromate; cobalt and ceria; nickel and ceria; nickel and alumina; etc.

The compounds from which the oxide of iron may be prepared include the artificially prepared ferrous carbonate and the mineral siderite. As in the preparation of catalytic masses generally it is advisable to prepare the ferrous oxide in such a way that it presents the greatest surface area possible to the gases. To effect such a result the hydroxide, oxalate, or carbonate of the iron in the divalent state, or mixtures thereof, may be calcined to prepare the desired oxide.

I have likewise found that the absorption capacity of ferrous oxide for the oxide of carbon can be augmented by having present with the iron oxide a substance which tends to stabilize the iron in the divalent condition, aluminum, for example, is suitable for this purpose. By maintaining the iron in this state of valence the increase in absorbing capacity improves greatly the efficiency of the process as few changes of the absorption mass are required. Other means may be employed which tend to improve the activity of the absorbent, for instance activating agents or promoters such as the halides of the alkaline earths, etc., if present with the iron, give this effect.

The charge of the ferrous oxide may be prepared in numerous ways. For example, the siderite, or the artificially prepared ferrous carbonate may be placed in the chamber in which the absorption is to take place and calcined to the ferrous state. If accelerators are to be employed they should preferably be combined or mixed with the iron prior to calcination. If the ferrous oxide is to be employed as a so-called acceptor for carbon dioxide in a hydrocarbon: steam conversion reaction, for example, the catalyst and the ferrous oxide acceptor should be prepared separately and admixed usually in the proportion of at least 10 parts of the acceptor with 1 part of the catalyst, preferably within the reaction chamber immediately prior to the start of the conversion. Should the ferrous carbonate be calcined and reduced with the catalyst it no longer acts as an efficient absorber of the oxides of carbon. The efficiency of the ferrous oxide as an absorbent is further augmented by calcining the iron compound (carbonate, oxalate, etc.) at the lowest possible temperature.

The following example will indicate the preferred procedure in carrying out the invention, it being understood that the invention is susceptible of wide variation in the manner of operation and is not limited to the specific details and methods of procedure herein described.

Mineral siderite, after being separated from contaminating impurities, is crushed to 4–8 mesh size. The product is charged into a reaction vessel, capable of withstanding pressure, of any suitable size and shape and the temperature is gradually raised to 525° C. while maintaining a pressure of one atmosphere. The decomposition of the carbonate is facilitated by passing a stream of sweeping gas, such as nitrogen, thru the apparatus during the heating. The major part of the carbon dioxide will come off rapidly at or below 450° C. and the temperature need be raised to 525° C. only in case it is desired to completely decompose the carbonate. Ferrous oxide prepared in the foregoing manner and preferably employed in the presence of a stabilizer and/or a promoter, may be used in many processes for the absorption of carbon dioxide.

It will be understood that the invention relates to removal of carbon dioxide from gaseous mixtures broadly, as, for example, mixtures containing carbon dioxide together with hydrogen, nitrogen, or gaseous hydrocarbons, etc., and that, therefore, wide variations may be made in its application to the purification of gaseous mixtures. Although reference herein is made more specifically to the use of ferrous oxide in removing carbon dioxide from gaseous mixtures containing carbon dioxide and hydrogen, it can be used for carbon dioxide removal generally from gaseous mixtures containing the same.

Various changes may also be made in the methods described without departing from the invention or sacrificing any of the advantages thereof.

I claim:

1. The process of removing carbon dioxide from a gaseous mixture containing the same which comprises contacting said gaseous mixture at an elevated temperature with ferrous oxide.

2. The process of removing carbon dioxide from a gaseous mixture containing the same which comprises contacting said gaseous mixture, together with steam, at an elevated temperature with ferrous oxide.

3. The process of removing carbon dioxide from a gaseous mixture containing the same which comprises contacting said gaseous mixture at an elevated temperature and at a pressure in excess of five atmospheres with ferrous oxide.

4. The process of removing carbon dioxide from a gaseous mixture containing the same which comprises contacting said gaseous mixture at an elevated temperature with ferrous oxide and aluminum.

5. The process of removing carbon dioxide from a gaseous mixture containing the same which comprises contacting said gaseous mixture at an elevated temperature with ferrous oxide and a halide of an alkaline earth.

6. The process of removing carbon dioxide from a gaseous mixture containing carbon dioxide and hydrogen, during their formation in the presence of a catalyst, which comprises contacting said gaseous mixture at an elevated temperature with ferrous oxide admixed with the catalyst in the proportion of at least 10 parts of ferrous oxide to 1 part of the catalyst.

7. The process of removing carbon dioxide from a gaseous mixture containing the same which comprises contacting said gaseous mixture at an elevated temperature with ferrous oxide promoted with a halide of an alkaline earth in the presence of aluminum.

In testimony whereof, I affix my signature.

JOHN C. WOODHOUSE.